United States Patent [19]

Dueringer

[11] 3,774,233

[45] Nov. 20, 1973

[54] METHOD AND APPARATUS FOR REPRODUCING TELEVISION IMAGES FROM A VIDEO SIGNAL

[75] Inventor: Heinrich Dueringer, Watt-Regensdorf, Switzerland

[73] Assignee: Eidophor AG, Glarus, Switzerland

[22] Filed: Feb. 14, 1972

[21] Appl. No.: 225,830

[52] U.S. Cl. .............................. 178/7.5 D, 178/7.87

[51] Int. Cl. ........ H04n 3/16, H04n 5/74, H04n 5/66

[58] Field of Search ........... 315/13 R, 13 C, 13 CG, 315/13 ST, 30; 313/91; 178/5, 7.5 R, 7.5 D, 7.3 D, 7.85, 7.87, 7.88

[56] References Cited

UNITED STATES PATENTS

| | | | |
|---|---|---|---|
| 3,582,185 | 6/1971 | Steiger et al. | 178/7.5 D |
| 3,541,992 | 11/1970 | Herrick et al. | 178/7.5 D |
| 3,538,251 | 11/1970 | Gear | 178/7.5 D |
| 3,678,196 | 7/1972 | Roth | 178/7.5 D |
| 3,016,417 | 1/1962 | Mast et al. | 178/7.5 D |

*Primary Examiner*—Robert L. Griffin
*Assistant Examiner*—Marc E. Bookbinder
*Attorney*—Ralph E. Parker et al.

[57] ABSTRACT

A method and apparatus are provided for reproducing television images the apparatus comprising a cathode ray gun, a deformable control medium, an electron beam deflection system for deflecting the electron beam produced by the gun over the medium in a raster pattern, an apertured diaphragm between the gun and the medium which splits the electron beam into three separate beams and a beam focusing system responsive to an applied video signal to vary the spacing between the individual beams on the control medium in accordance with the information contained in the video signal. The medium is illuminated by a light source and light reflected from the medium as it is deformed by the electron beam is passed through a Schlieren-optical system to an image screen.

13 Claims, 5 Drawing Figures

METHOD AND APPARATUS FOR REPRODUCING TELEVISION IMAGES FROM A VIDEO SIGNAL

This invention relates to a method of and apparatus for reproducing television images.

BACKGROUND TO THE INVENTION AND PRIOR ART

In one known system for reproducing television images the surface of a control medium associated with a Schlieren-optical system is deformed by a cathode-ray beam in a raster pattern to control light passing through the optical system, the cathode-ray beam being defocussed by auxiliary focusing means in accordance with the image brightness information contained in the video signal. Since this system depends on the number of lines of the television standard, it suffers from the disadvantage of requiring different control media or control medium parameters for adaptation to different television standards. Moreover, since the de-focusing of the beam resulting from a change from a bright image to a dark image always involves a redistribution of the charge on the control medium and since the beam is of approximately circular shape, it is not possible for the charge to be redistributed suddenly but only within a relatively large interval of time. In consequence this method of modulation results in a loss of contrast and brightness.

SUMMARY OF THE INVENTION

The invention seeks to avoid these disadvantages by sub-dividing the electron beam into a plurality of beams which are spaced apart to fall on each side of a line, the relative spacing between the beams being varied in accordance with the video signal voltage applied to the auxiliary focusing means.

In this respect the invention differs from those known modulation methods which are based on the principle of pure amplitude modulation and in which light control is based on homogenising the charge distribution, given a uniform deformation period for the control medium. However, in the method according to this invention it is not the amplitude required to defocus the spot beam on the control medium but the frequency at which the spacing between individual beams in a direction normal to a line that is varied.

The invention furthermore relates to apparatus for performing the aforementioned method using a cathode-ray tube, an electron beam deflection system, a beam focusing system, auxiliary focusing means which may be controlled by the video signal voltage and a control medium, an aperture diaphragm being disposed in the path of the electron beam for sub-dividing the beam into $n$ beams, $n$ being an integer greater than 1, preferably being equal to 3.

BRIEF DESCRIPTION OF THE DRAWINGS

A preferred embodiment of the invention will be explained hereinbelow with reference to the accompanying drawings in which.

DETAILED DESCRIPTION OF THE PREFERRED EMBODIMENT

Figure 1:
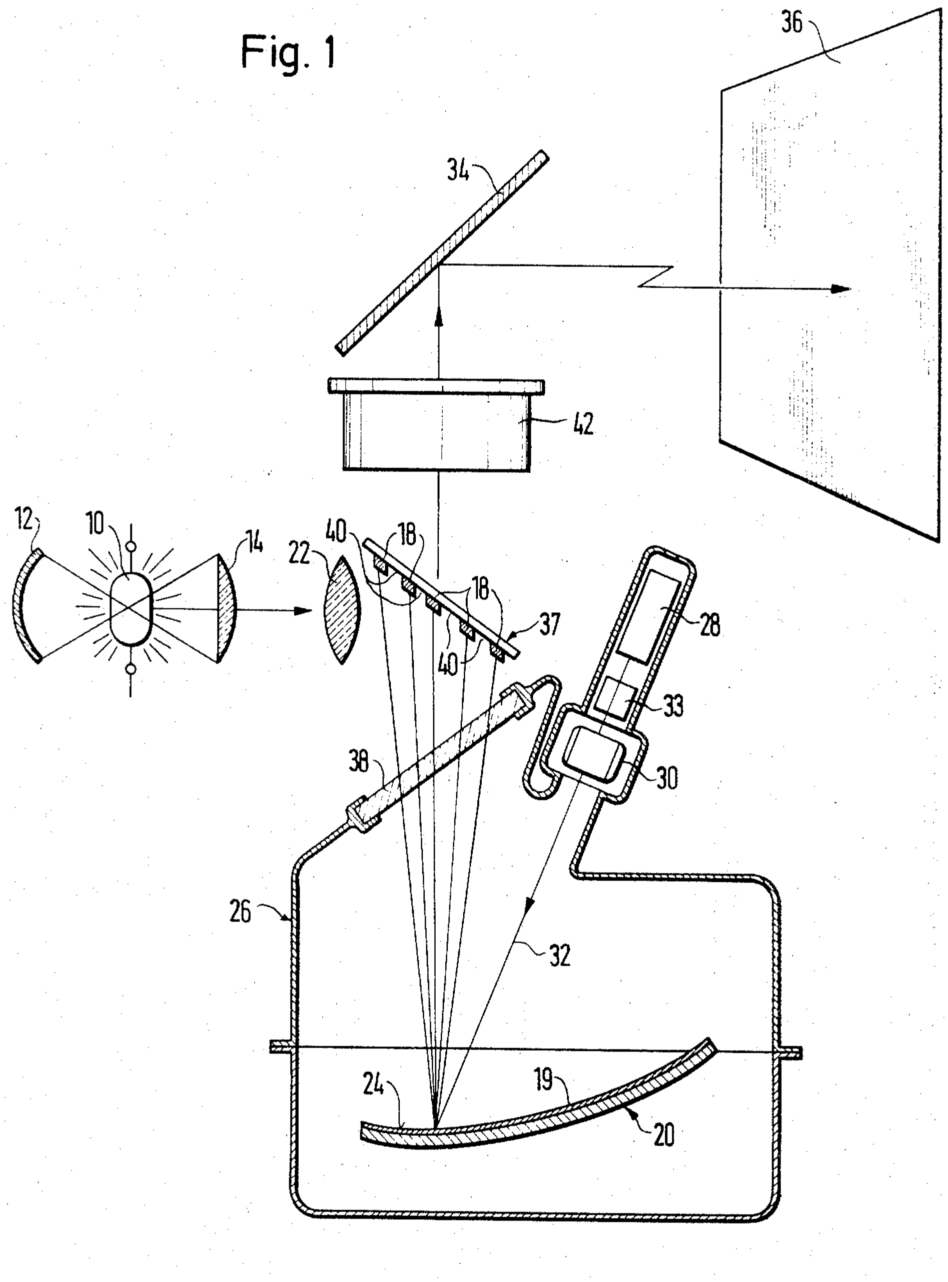
FIG. 1 shows one embodiment of apparatus according to the invention.

In FIG. 1 a reflector 12 is disposed behind a gas discharge lamp 10 and a condenser lens 14 is disposed in an optical path in front of the lamp. Light from the lamp 10 is projected on to the reflecting surface of the bars 18 of a mirror bar system 37 and is reflected by the surface of the bars on to a control medium 19 which is spread as a thin layer on the surface of a concave reflector 20. A lens 22 images the condenser lens 14 approximately in the plane of the image field 24, this being the plane of the control medium. This known system is employed for the projection of television images. To this end, the concave reflector 20 is disposed within a vacuum vessel 26 which also has therein a cathode-ray tube 28 with a deflection system 30 and a focusing and modulating system 33.

The electron beam 32 produced by the cathode-ray tube 28 is deflected by the deflection system 30 to produce a raster of adjacently disposed lines which are modulated by the video signal so that a charge distribution is produced on the surface of the control medium in the image field. The raster lines produced on the control medium extend parallel to the bars 18. The bar system 37 is located at the centre of curvature of the concave reflector 20 so that when the surface of the control medium is not deformed the light from the light source 10 is reflected by the bars 18, passed through a plane glass plate 38 in the vessel 26 on to the concave reflector 20 which reflects the light back to the reflecting surfaces of the bars and thence to the source 10. If a point on the surface of the control medium is deformed the light at this image point is deflected in accordance with the magnitude of deformation relative to the undeformed state. The reflected light passes through the spaces 40 between the bars 18 and is focused by a projection objective 42 on a screen 36 after being reflected by a reflector 34. Means for rotating the reflector 20 and for regulating its temperature have been omitted from the illustration in the interests of clarity.

The particular construction of the focusing and modulating system 33 will be explained below with reference to FIGS. 2 to 5.

Figure 2:
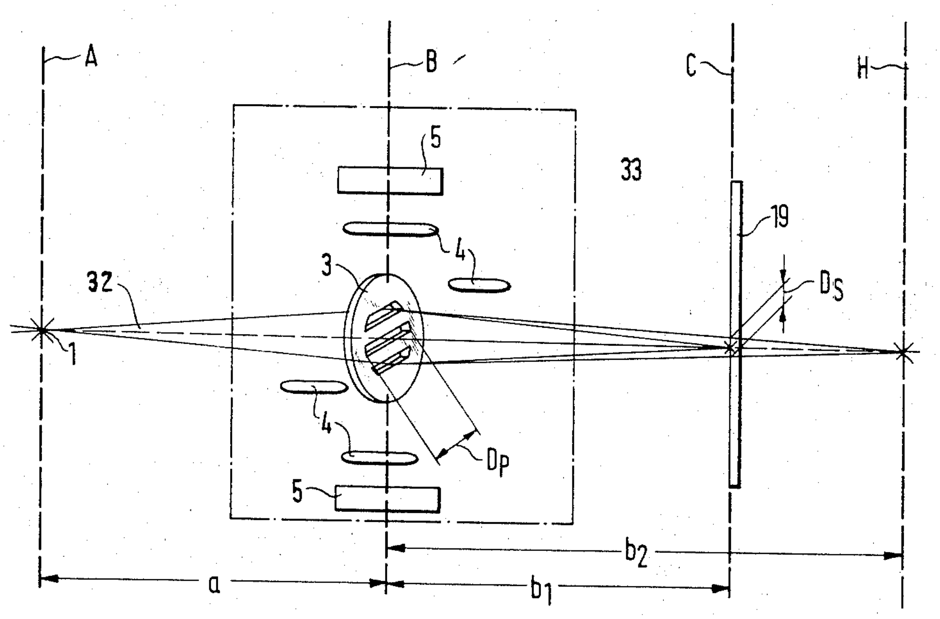
FIG. 2 is a detailed view of part of the apparatus shown in FIG. 1.

FIG. 2 shows a detailed view of the focusing and modulating system 33 having an apertured diaphragm 3, auxiliary focusing means in the form of quadrupole lens 4, and a beam focusing unit 5. The apertured diaphragm 3 is disposed in the path of the electron beam 32 between the control medium 19 and the cross-over point 1 of the electron beam produced by the geometry of the electron gun in the cathode-ray tube 28. The diaphragm 3 has three horizontal slits disposed as shown in FIG. 2 which are silhouetted on the surface of the control medium 19. Given an aspect ratio of for example 1:1, the edge sharpness or lack of sharpness of the silhouette of the apertured diaphragm 3 will be identical to the sharpness of the electron beam at the cross-over point. Three spatially separated charge images on the surface of the control medium 19 will be produced, the dimensions and relative positions of the charge images depending on the diameter of the beam at the cross-over point, on the spacing of the slits and on the aspect ratio. The production of three charge images on the surface of the control medium instead of a single such charge image corresponds to an increase in the spatial frequency. The orientation of the apertures in the diaphragm 3 is selected so that the spatially separate charge images are disposed above and below the television raster line. If the electron beam is deflected in a direction perpendicular to the television raster line, spatially separate charge lines will therefore be produced from the charge images, this being equivalent to an increase in the number of lines. The charge densities of the three aformentioned charge lines must be substantially identical in order to avoid irregularities in the charge densities of the three aforementioned charge lines which would give rise to undesirable low frequency control medium deformation components. This is achieved by making the dimensions of the diaphragm apertures such as to produce approximately equal Gaussian current distribution in the three spatially separate electron beams. The electromagnetic or electrostatic beam focusing unit 5 located between the cross-over point 1 and the control medium 19 focusses an electron image of the cross-over point on the control medium. The quadrupole lens 4 has a similar effect to that of the beam focusing unit 5 but its field acts in opposition to that of the beam focusing unit. Both units act together in focussing the electron beams, the focus of the beam focusing unit 5 being constant and that of the quadrupole lens 4 being made variable by the applied video signal. Maximum amplitude of the video signal corresponds to minimum brightness, that is to say black, and its minimum amplitude corresponds to maximum brightness. The quadrupole lens 4 is ineffective with an applied video signal of nearly zero the beam focusing unit 5 only being effective to focus and combine the beams into a single beam at the surface of the control medium 19. No silhouette of the apertured diaphragm 3 therefore appears, only a point image of the cross-over point 1. A maximum amplitude video signal corresponding to black applied to the quadrupole lens 4 increases its focal power to such an extent that the fields of the focusing unit 5 and of the lens 4 almost cancel each other out so that a silhouette of the aperture diaphragm 3 of diameter $D_s$ appears on the surface of the control medium 19.

The interrelationship between the apertured diaphragm 3, quadrupole lens 4 and beam focusing unit 5 may be expressed as follows:

A — Plane of the electron beam cross-over point 1
B — Plane of the beam focusing unit 5
C — Plane of the control medium 19
$D_p$ — Diameter of the apertured diaphragm 3
$D_s$ — Diameter of the silhouette of the apertured diaphragm in the plane C
$a$ — Distance between the planes A and B
$b_1$ — Distance between the planes B and C The beam focusing unit 5 has a focal power $1/F_M$ and the quadrupole lens 4 has a focal power $1/F_H$, H being the plane in which falls the image of the cross-over point when the combined focal power is $1/F_M - 1/F_H$ and $b_2$ refers to the distance between the planes B and H.

Accordingly:

$$D_s/D_p = (b_2 - b_1)/b_2$$

where:

$$1/F_M = 1/a + 1/b_1$$

thus:

$$b_1 = a/(a/F_M) - 1$$

Furthermore:

$$1/F_M - 1/F_H = 1/a + 1/b_2$$

thus:

$$b_2 = a/a\ [(1/F_M) - (1/F_H)] - 1$$

When inserted into the first expression it follows that:

$$D_s = D_p \frac{\dfrac{a}{a\left[\dfrac{1}{F_M} - \dfrac{1}{F_H}\right] - 1} - \dfrac{a}{\dfrac{a}{F_M} - 1}}{\dfrac{a}{a\left[\dfrac{1}{F_M} - \dfrac{1}{F_H}\right] - 1}}$$

In the event of the quadrupole lens 4 being ineffective $$1/F_H = 0$$

and therefore:

$$D_s = 0$$

or expressed in other words a silhouette which becomes a 'point' and has therefore been converted into an image of the electron beam cross-over point. If on the other hand the focal power of the quadrupole lens 4 is increased to the extent that:

$$1/F_M - 1/F_H = 0$$

or expressed in other words, that the fields of the focusing and quadrupole lens cancel each other out it follows that:

$$D_s = D_p\ (a + b_1)/a$$

or expressed in other words, a silhouette the diameter of which is defined by the extremely simple laws of silhouette optics.

This shows that the silhouette image size may be controlled as a function of the focal power of the quadrupole lens or, expressed in other words, local separation or divergence of the individual electron beams may be controlled by the voltage applied to the quadrupole lens. By increasing the video signal voltage from a value corresponding to white the silhouette image size and therefore the spatial frequency will increase. An increasing spatial frequency is accompanied by an increase in the number of lines and the image brightness therefore falls.

Figure 3:
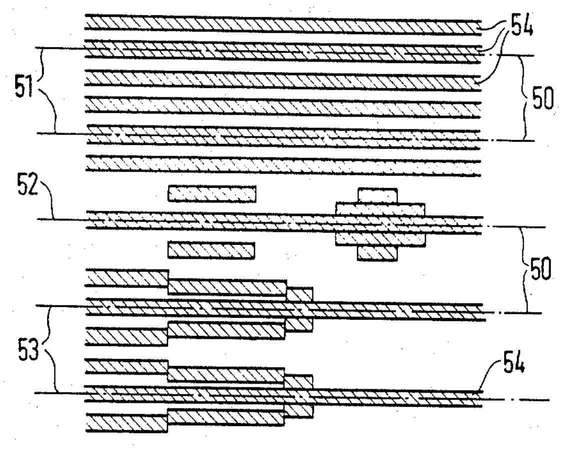
FIG. 3 is a diagram illustrating the results of beam deflection produced by the apparatus shown in FIG. 2, and FIGS. 4 and 5 show two different forms of apertured plate to that shown in FIG. 2.

FIG. 3 is an enlarged section of the image field traversed by the electron beam some of the horizontal scan lines of one video frame being indicated by lines 50 which are interlaced in the normal way.

The decay period of the charges on the control medium is selected so that the image intensity during one video frame has practically diminished to zero to prevent interference with successive frames. Electric charge lines 54 produced on the surface of the control medium are shown in hatched form in FIG. 3, the number of such lines varying with the amplitude of the video signal voltage up to a maximum provided by the number of apertures in the diaphragm. The charge along the lines 51 represents an image of the cross-over point and where no other lines of charge are produced each side of the scan line corresponds to an image of maximum brightness. The image brightness diminishes along the lines 53 from right to left. Line 52 indicates the case in which the image brightness increases and then decreases along the line. The merging of charge zones between the areas of individual brightness may be gradual — line 52 on the right — or sudden — line 52 on the left.

Figure 4:
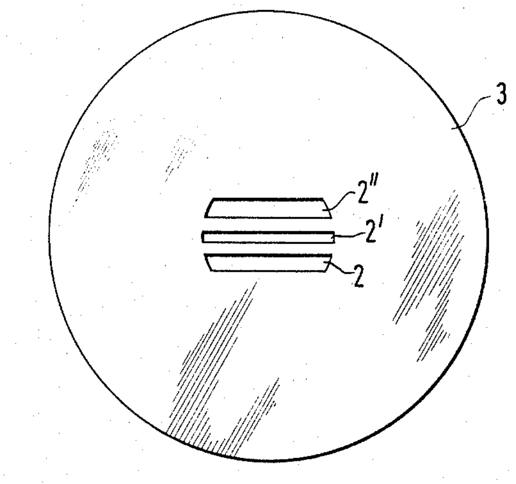
Figure 5:
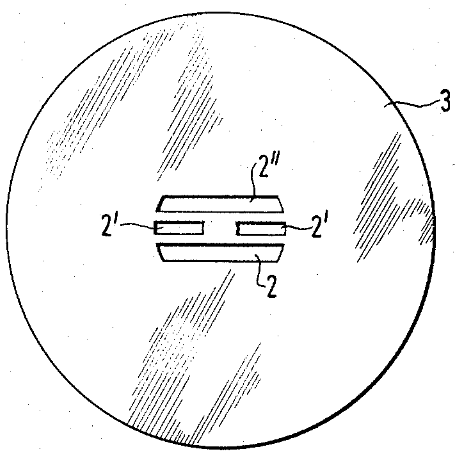

FIGS. 4 and 5 show two forms of apertured diaphragms having three slits. In FIG. 4 equalisation of the Gaussian current distribution within the electron beams is achieved by making the middle slit 2′ narrower than the two outer slits 2 and 2″. In the embodiment illustrated in FIG. 5, all three slits are of equal width, but the middle slit 2′ comprises two discrete parts. In both embodiments the cross-section of the middle slit 2′ is smaller than the cross-section of each of the two outer slits 2 and 2″ which are identical to each other.

In addition to the advantages already mentioned, the method described hereinabove offers a further advantage due to the fact that the decay time of the control medium diminishes with increasing spatial frequency and that furthermore the residual deformation of the control medium which remains after one frame has been scanned also diminishes with an increasing spatial frequency. Variation of the spatial frequency therefore enables not only the light intensity but also the storage characteristics of the control medium to be varied within wide limits. Influencing or controlling the storage time and residual control medium deformation of television reproduction systems made possible by spatial frequency modulation permits the use of a universal control medium the storage characteristics of which can be adapted to different requirements or to the number of lines of the different television standards. The only remaining condition is that the intrinsic storage time of the control medium must always be greater than the storage time required for each frame scan since control of storage time is possible only towards shorter storage times.

What is claimed is:

1. A method of reproducing television images from a video signal comprising generating an electron beam, subdividing the electron beam into a plurality of beams, focusing the sub-divided beams onto a deformable control medium, scanning said control medium in a raster pattern with said sub-divided beams, varying the position of the sub-divided beams on the control medium in accordance with said video signal whereby the beams are superimposed at the control medium when a video signal of a first predetermined amplitude is applied and are spaced apart at the control medium when a video signal of a second predetermined amplitude is applied, projecting light from a source onto said medium and imaging the light reflected from said medium through a Schlieren-optical system onto an image screen.

2. A method according to claim 1, including maintaining the intensity of the electron beam constant during scanning each line of said raster pattern.

3. A method according to claim 1, including sub-dividing the electron beam by means of an apertured plate.

4. A method according to claim 1, including focusing the electron beam to converge to a minimum diameter at a predetermined distance from said control medium so that it diverges from said minimum diameter towards said medium, sub-dividing the electron beam as it diverges and varying the focussing of the sub-divided beams in sympathy with the video signal.

5. A method according to claim 4, including providing separate focusing means to focus the subdivided beams to superimpose them at said control medium and providing auxiliary focusing means influencing the separate focusing means in sympathy with the video signal to vary the spacing of the beams at the control medium.

6. Apparatus for reproducing television images comprising, a deformable control medium, a cathode ray tube, means for subdividing the beam of the cathode ray tube into a plurality of beams, a beam deflecting system for deflecting said sub-divided beams over said control medium in a raster pattern, focusing means responsive to the video signal to vary the spacing of the sub-divided beams on the control medium, a screen, a light source projecting light onto said medium and a Schlieren-optical system for imaging light reflected from said medium onto said screen.

7. Apparatus according to claim 6, wherein said subdividing means includes an apertured plate.

8. Apparatus according to claim 7, wherein the dimensions of the apertures in said plate are chosen to provide an equal Gaussian distribution in each of the sub-divided beams.

9. Apparatus according to claim 8, wherein said apertured plate includes a plurality of slits and the plate is mounted in said tube so that the longitudinal axis of said slits are parallel to the lines of said raster pattern.

10. Apparatus according to claim 6, wherein said focusing means comprises a main electron lens focusing said beams so that they are superimposed on said control medium and an auxiliary electron lens modifying the effect of said main electron lens to vary the spacing of said beams on said control medium in response to the video signal.

11. Apparatus according to claim 10, in which said auxiliary lens is a quadropole lens.

12. Apparatus according to claim 10, wherein said main and auxiliary electron lens are electromagnetic lenses.

13. Apparatus according to claim 10, wherein said main and auxiliary electron lens are electrostatic lenses.

* * * * *